(12) United States Patent
Banerjee et al.

(10) Patent No.: US 11,880,867 B2
(45) Date of Patent: Jan. 23, 2024

(54) SYSTEMS AND METHODS FOR PROVIDING TARGETED CONTENT TO USERS

(71) Applicant: Ford Global Technologies, LLC, Dearborn, MI (US)

(72) Inventors: Subharthi Banerjee, Dearborn, MI (US); Somak Datta Gupta, Novi, MI (US); Oliver Lei, Windsor (CA); Vladyslav Slyusar, Northville, MI (US); Arpita Chand, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/648,872

(22) Filed: Jan. 25, 2022

(65) Prior Publication Data

US 2023/0237529 A1    Jul. 27, 2023

(51) Int. Cl.
*G06Q 30/0251*    (2023.01)
*G06F 16/955*    (2019.01)
*G10L 15/18*    (2013.01)

(52) U.S. Cl.
CPC ....... *G06Q 30/0261* (2013.01); *G06F 16/955* (2019.01); *G06Q 30/0266* (2013.01); *G06Q 30/0267* (2013.01); *G06Q 30/0271* (2013.01); *G10L 15/1815* (2013.01)

(58) Field of Classification Search
CPC .......... G06Q 30/0261; G06Q 30/0266; G06Q 30/0267; G06Q 30/0271; G06Q 30/0265; G06F 16/955; G10L 15/1815; G10L 15/18

See application file for complete search history.

(56) References Cited

U.S. PATENT DOCUMENTS

| | | | |
|---|---|---|---|
| 9,183,572 B2* | 11/2015 | Brubaker | G06Q 30/02 |
| 11,392,988 B1* | 7/2022 | Isgar | G07C 5/008 |
| 2010/0293033 A1 | 11/2010 | Hall et al. | |
| 2011/0078024 A1 | 3/2011 | Messier et al. | |
| 2011/0184813 A1* | 7/2011 | Barnes | G06F 16/9535 |
| | | | 705/14.66 |
| 2013/0238745 A1* | 9/2013 | Ramachandran | H04N 21/2396 |
| | | | 709/217 |

(Continued)

OTHER PUBLICATIONS

Fabienne Lang, Ford Patents Tech to Display Ads Inside Cars' Infotainment Systems, Innovation (https://Interestingengineering.com/Innovation, 1-8.

(Continued)

*Primary Examiner* — Marie P Brady
(74) *Attorney, Agent, or Firm* — Brandon Hicks; Eversheds Sutherland (US) LLP

(57) ABSTRACT

The disclosure generally pertains to systems and methods for providing targeted content to users. In an example method, audio data can be received from a device. Sensor data associated with the device may also be received, and the sensor data may include location data. Upon receiving the audio data, an intent associated with the audio data can be determined. At least one of a product, service, or entity may be determined based on the intent. Content may then be determined based on the sensor data and at least one of the product, service, or entity. The content may be associated with a vehicle. An indication of the content can then be sent to the device.

14 Claims, 5 Drawing Sheets

(56) References Cited

U.S. PATENT DOCUMENTS

| | | | |
|---|---|---|---|
| 2014/0344627 A1* | 11/2014 | Schaub | G06F 3/167 |
| | | | 714/46 |
| 2014/0351054 A1 | 11/2014 | Ahn et al. | |
| 2016/0104486 A1* | 4/2016 | Penilla | G10L 15/02 |
| | | | 704/232 |
| 2017/0097243 A1 | 4/2017 | Ricci | |
| 2017/0104824 A1* | 4/2017 | Bajwa | H04W 4/80 |
| 2019/0051287 A1* | 2/2019 | Nomura | G06F 16/3329 |
| 2019/0222885 A1* | 7/2019 | Cho | G06Q 30/0265 |
| 2019/0370863 A1* | 12/2019 | Seo | H04W 4/40 |
| 2020/0204280 A1* | 6/2020 | Thagadur Shivappa | |
| | | | G09G 5/22 |
| 2020/0219131 A1* | 7/2020 | Isgar | H04L 67/52 |
| 2020/0294092 A1* | 9/2020 | Tong | G06F 3/147 |
| 2022/0205806 A1* | 6/2022 | Isgar | G06F 16/9537 |
| 2023/0237529 A1* | 7/2023 | Banerjee | G06F 16/955 |
| | | | 705/14.58 |

OTHER PUBLICATIONS

Gino Sesto, What is Taxi Advertising?—The Best Taxi Advertising Guide to Pricing and Types of Taxi Cab Ads, Oohtoday, Mar. 16, 2021, 1-12.

* cited by examiner

SYSTEMS AND METHODS FOR PROVIDING TARGETED CONTENT TO USERS

BACKGROUND

Business owners may seek to advertise their businesses to users via banner content and web-based content. However, in some instances, because a user may view the content at a time where the products, services, or entities associated with the content may not be necessary to the potential user, the user may not retain the information contained in the content until such a time as the user acts on a need for said products, services, or entities. Even if the user searches for the product, service, or entity at a later time, an internet search may not return certain business owners' information viewed by the user.

BRIEF DESCRIPTION OF THE DRAWINGS

A detailed description is set forth below with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
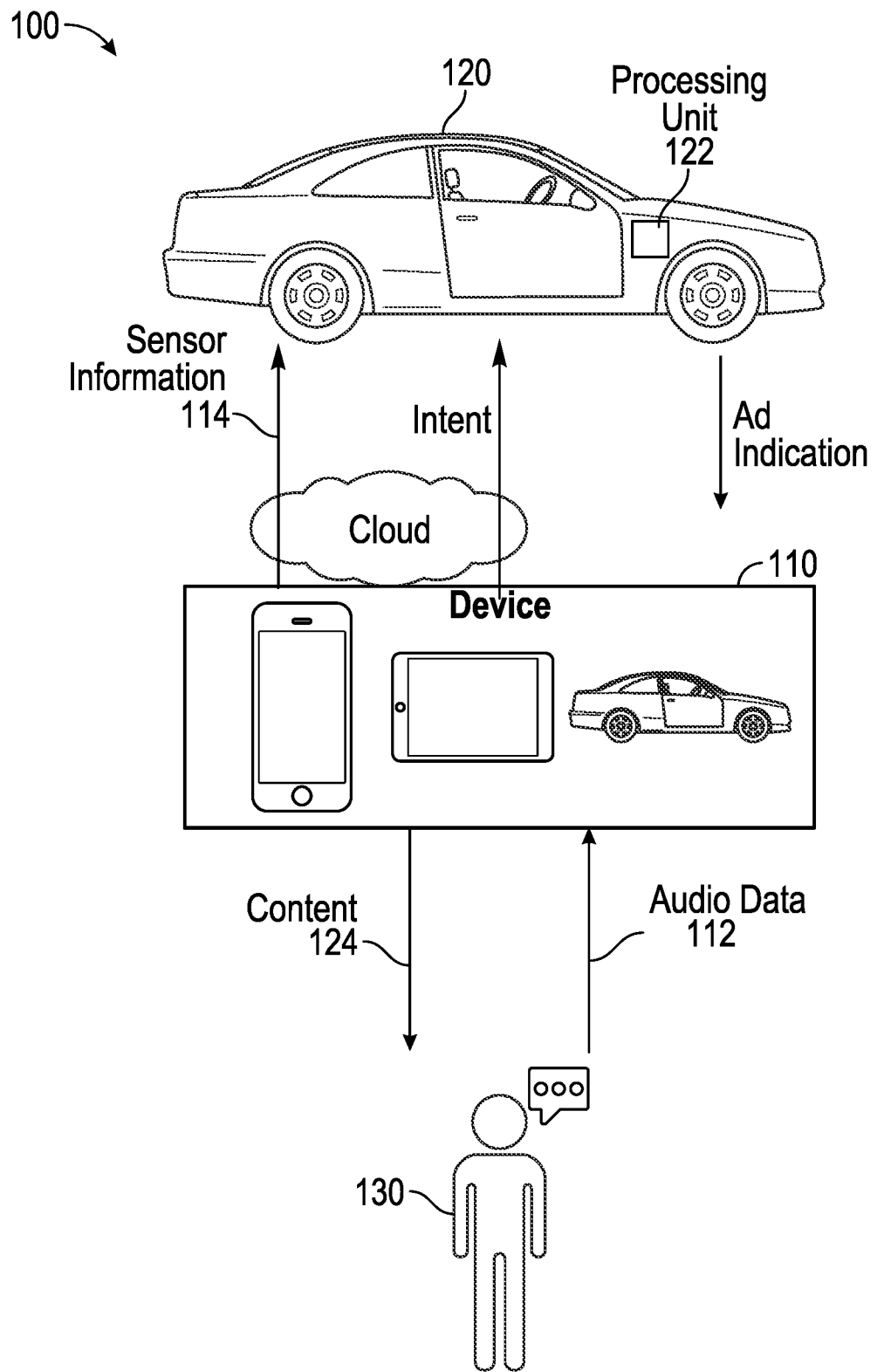
FIG. 1 illustrates an example system for determining targeted content in accordance with an embodiment of the disclosure.

In terms of a general overview, certain embodiments described in this disclosure are directed to systems and methods for providing targeted content to users. In an example method, audio data can be received from a device. Sensor data, which may be indicative of a location of the device approximate to the time that the audio data is received by the device, may also be received. Upon receiving the audio data, an intent associated with the audio data can be determined. At least one of the products, services, or entities may be determined based on the intent. Targeted content, such as an advertisement, may then be determined based on the sensor data and at least one of the products, services, or entities. The content may be associated, for example, with a vehicle at a location proximate to the device location, as may be determined through the sensor data. An indication of the content can then be sent to the device.

Illustrative Embodiments

The disclosure will be described more fully hereinafter with reference to the accompanying drawings, in which example embodiments of the disclosure are shown. This disclosure may, however, be embodied in many different forms and should not be construed as limited to the example embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described example embodiments but should be defined only in accordance with the following claims and their equivalents. The description below has been presented for the purposes of illustration and is not intended to be exhaustive or to be limited to the precise form disclosed. It should be understood that alternate implementations may be used in any combination desired to form additional hybrid implementations of the present disclosure. For example, any of the functionality described with respect to a particular device or component may be performed by another device or component.

Furthermore, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

Certain words and phrases are used herein solely for convenience and such words and terms should be interpreted as referring to various objects and actions that are generally understood in various forms and equivalencies by persons of ordinary skill in the art. For example, the word "customer" may be used interchangeably with the word "user." Either word as used herein refers to any individual whose intent is being determined. The word "device" may be any of various devices, such as, for example, a user device such as a smartphone or a tablet, a smart vehicle, and a computer. The word "vehicle" may be used interchangeably with the phrase "business vehicle."

It must also be understood that words such as "implementation," "scenario," "case," and "situation" as used herein are an abbreviated version of the phrase "in an example ("implementation," "scenario," "case," "approach," and "situation") in accordance with the disclosure." Furthermore, the word "example" as used herein is intended to be non-exclusionary and non-limiting in nature.

FIG. 1 illustrates an example system 100 for determining targeted content in accordance with an embodiment of the disclosure. A device 110 may be used to receive audio data 112 and to determine sensor information 114. In some embodiments, the device 110 may be a user device, such as a smartphone, a tablet, a laptop, a wearable device, or other user devices. In other embodiments, the device 110 may be an integral component of a vehicle that a user is either driving or a vehicle that the user is a passenger in. In some embodiments, the audio data 112 may include content that is being spoken or expressed by a user 130. In some embodiments, the sensor information 114 may include content associated with the device 110, for example, image data or location data associated with the device 110.

In some embodiments, the audio data 112 may be locally processed at the device 110 or may be remotely processed at a server. In some embodiments, the audio data 112 may be processed using natural language programming (NLP). In some embodiments, an intent of the user 130 may be identified based on the audio data 112. The intent and the sensor information 114 may then be transmitted to a nearby business vehicle 120 having a processing unit 122. In some embodiments, the business vehicle 120 may be considered to be nearby if it is within a predetermined distance of the device 110. For example, business vehicles 120 may be considered to be nearby or proximate if they are within half a mile of the device 110. In other embodiments, the business vehicle 120 may be considered to be nearby if it was within the predetermined distance from the device 110 within a predefined period of time. For example, if the business vehicle 120 was within the predetermined distance of the device 110 within the past ten minutes, then the business vehicle 120 may be considered to be nearby.

In some embodiments, the processing unit 122 may then determine a product, a service, and/or an entity associated with the intent of the user 130. For example, if the intent of the user 130 is to paint their house, then the determined products, services, and/or entities may include house painting businesses, house painting services, paints, and paint materials. In some embodiments, the processing unit 122 may determine if a business associated with the business vehicle 120 matches the intent of the user The processing unit 122 may then identify content 124 based on the sensor information 114 and the determined products, services, and/or entities. For example, in the instance above, the content 124 may include advertisements for house painting businesses, house painting services, paints, and paint materials. In some embodiments, the content 124 may be associated with the business vehicle 120.

In other embodiments, the content 124 may be associated with another vehicle at a location proximate to the device 110. In some embodiments, proximity may refer to the other vehicle being within a predetermined distance of the device 110. For example, the other vehicle may be considered to be nearby or proximate if it is within half a mile of the device 110. In other embodiments, the other vehicle may be considered to be nearby if it was within the predetermined distance from the device 110 within a predefined period of time. For example, if the other vehicle was within the predetermined distance from the device 110 in the past ten minutes, then the another vehicle may be considered proximate.

In some embodiments, an indication of the content 124 may be generated and then sent to the device 110. In some embodiments, indications of the content 124 may include web links associated with the product, service, and/or entity, QR codes associated with the product, service, and/or entity, and any other means of providing the user 130 with access to the product, service, and/or entity. In such an embodiment, the web links, QR codes, and other means of providing the user 130 with access to the product, service, and/or entity are directly sent to the device 110. In other embodiments, indications of the content 124 may be in the form of a cookie that may be stored at device 110 until such time as the user 130 searches for content associated with the product, service, and/or entity. In such an embodiment, the cookie may be sent to the device 110 and the content 124 may not be presented to the user 130 until the user 130 actively searches for content associated with the product, service, and/or entity or until the user 130 seeks to access information associated with the product, service, and/or entity. In such an embodiment, the user 130 may be associated with an anonymous ID.

In some embodiments, the device 110 and the business vehicle 120 are configured to communicate via a network, such as, for example, a computer (a server computer, a cloud computer, etc.) and/or a cloud storage device.

The network may include any one, or a combination of networks, such as, for example, a local area network (LAN), a wide area network (WAN), a telephone network, a cellular network, a cable network, a wireless network, and/or private/public networks such as the Internet. Further, a variety of direct communication protocols and network-based communications technologies, such as, for example, TCP/IP, Bluetooth®, near-field communication (NFC), Wi-Fi, Wi-Fi Direct, Ultra-Wideband (UWB), cellular, ZigBee®, machine-to-machine communication, and/or man-to-machine communication.

Figure 2:
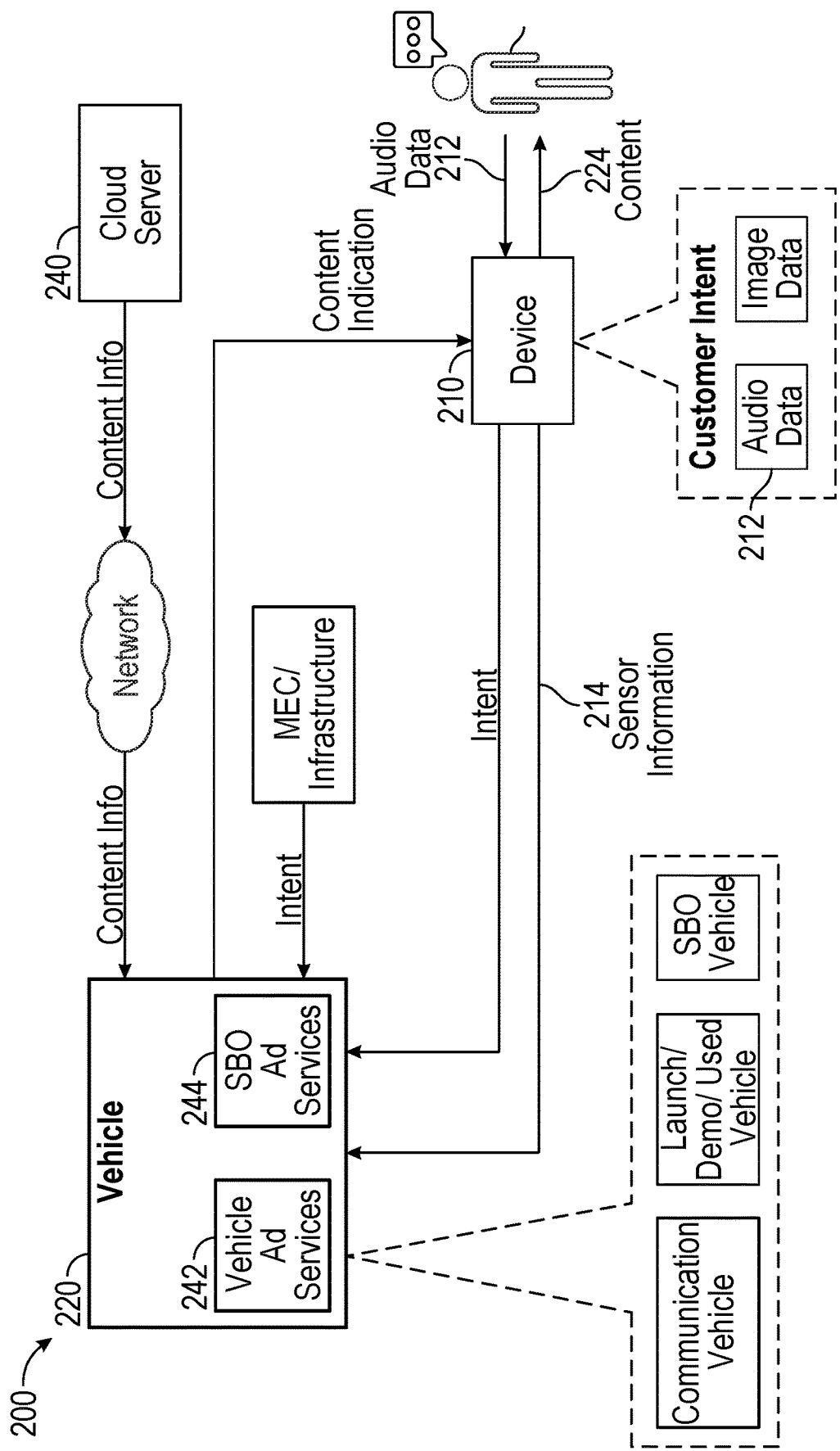
FIG. 2 illustrates an example implementation of an advertising service in accordance with an embodiment of the disclosure.

FIG. 2 illustrates an example implementation of an advertising service 200 in accordance with an embodiment of the disclosure. An advertising service 200 may involve a user device 210. As depicted in FIG. 2, the user device 210 may be a smartphone. Although not depicted in FIG. 2, the user device 210 may be a vehicle computer in a vehicle. In some embodiments, the user device 210 may be used to collect audio data 212 and/or other sensor information 214 if a user 230 has approved the collection of such audio data 212 and/or other sensor information 214. In some embodiments, the collection of audio data 212 may be performed with the assistance of a voice assistant.

In some embodiments, the user's 230 intent may be determined based on the audio data 212. For example, the user 230 may be talking about obtaining a new electric vehicle or painting their house. Audio data 212 associated with the user's 230 speech may then be collected and used for processing. In some embodiments, the audio data 212 is collected and processed locally at the user device 210 or remotely at a cloud server, for example, cloud server 240, to determine the user's intent. The user's 230 intent or sentiment may further be determined based at least in part on the audio data 212 and image collected at the device 210. For example, NLP may be applied to determine that the user 230 is intending to buy a new electric vehicle or paint their house. In one embodiment, the audio data 212 may be processed at an audio processing module configured to determine the contents of the audio data 212. For example, the audio processing module may parse or segment the audio data 212 to identify words, phrases, and other expressions that may be indicative of the user's 230 intent. In some embodiments, an unidentifiable or an untaggable hashed identification (ID) may be generated in connection with the user's 230 determined intent.

In some embodiments, the user's 230 intent may further be determined based at least in part on mobile-edge computing (MEC) or infrastructure. In some embodiments, the user's 230 intent may further be determined based at least in part on cameras at roadside units or Remote Side Units (RSUs). For example, the user's 230 body positioning, conversations, and/or orientation may be captured by a camera at the MEC or an RSU, and this information may be used to determine the user's 230 intent based on posture analysis and/or NLP. As an example, if the camera at the MEC or the RSU detects the user 230 leaning towards and observing a particular vehicle for a period of time, the MEC or RSU may generate a query for devices in the surrounding area, and may continue to send queries to surrounding devices if no historical interest is detected at the devices. If the MEC or RSU is unable to establish a link to surrounding devices, the MEC or RSU may be able to query cloud server 240 for IDs associated with proximate devices. The IDs associated with proximate devices may refer to device IDs or account IDs associated with the proximate devices.

In some embodiments, the user's 230 intent may be inferred by the business vehicle 220. For example, if the user 230 is standing in front of the business vehicle 220, at least one camera at the business vehicle 220 may determine the user's 230 intent by evaluating the user's 230 body positioning, conversations, and/or orientation. The user's 230 intent may be determined at a processing unit of the business vehicle 220 or remotely at the cloud server 240.

Thus, in addition to the user's 230 intent being determined at the business vehicle 220 or at the cloud server 240, it is possible that the user's 230 intent may be determined at device 210 or the MEC. For example, the business vehicle 220 may receive the user's 230 intent directly via a network as a Network-to-Vehicle link. The business vehicle 230 may also receive the user's 230 intent directly via device 210, for example, a smartphone. The business vehicle 220 may also receive the user's 230 intent directly from the MEC wireless as Infrastructure-to-Vehicle communications via wireless communications protocol, for example, PCS, Bluetooth®, Wi-Fi, and other wireless communications protocols. In such embodiments, only an anonymized ID associated with the device 210, location data associated with the device 210, and the user's 230 intent may be transmitted from the device 210.

In some embodiments, a notification of the determined intent may be sent from the device 210 to a business vehicle 220. In some embodiments, the business vehicle 220 may be a commercial vehicle, a launch vehicle, a demo vehicle, a used vehicle, a vehicle owned by a small business owner, or a Ford vehicle. The business vehicle 220 may include vehicle advertisement services 242 and small business owner (SB 0) advertisement services 244. Vehicle advertisement services 242 may include dealership information, vehicle inventory, vehicle features, location-based grouping information, targeted advertisement databases, and other information. SBO advertisement services 244 may include location services, local transaction information, location-based grouping information, advertisement databases associated with SBOs, and other SBO features.

In some embodiments, the determined intent may be used to generate an indication of content 224. Information relating to content 224 may be transmitted to business vehicle 220 from cloud server 240 through a network. The business vehicle 220 may then transmit an indication of the content 224 to the device 210. The indication may be transmitted to the device 210 via a Vehicle-to-Network (V2N), a Vehicle-to-Infrastructure (V2I), a Vehicle-to-Everything (V2X), or a Vehicle-to-Pedestrian (V2P) communication. In some instances, the indication may take the form of a cookie to be stored at the device, and the content 224 may then later be displayed at a device 110, for example, a smartphone or a laptop, when the user 230 searches for content related to the content 224. In some instances, the indication may include SBO information or Direct-to-Customer information. In some embodiments, the device 210 may query the user 230 if the user 230 is interested in storing cookies relating to content 224. If the user 230 indicates interest, the indication of the content 224 may then be transmitted to the device 210. In some embodiments, if the device 210 is a vehicle, the content 224 may be presented to the user 230 via an infotainment system of the vehicle in real time. The content 224 may directly present an offer of services associated with the product, service, and/or entity, or the content 224 may take the form of an advertisement that the user 230 may click to reach an offer of services. The user 230 may then indicate interest in the offer of services, or the offer of services may be automatically associated with the user 230. In some instances, where the infotainment system of the vehicle is connected to other accounts owned by the user 230, the indication of the content 224, for example, a cookie, may be sent to the other accounts owned by the user 230. Subsequently, when the user 230 uses a device, for example, device 110 as depicted in FIG. 1, that is connected to the other accounts, the indication of the content 224 is automatically implemented to assist the user 230 in locating the previously-generated offer of services.

In some embodiments, device 210 may determine a present location of the device 210 and transmit requests to a nearby business vehicle 220 for content 224. If the business vehicle 220 is seeking to send out content 224, then an indication of the content 224 is transmitted from the business vehicle 220 to the device 210.

In some embodiments, the cloud server 240 may store hash IDs associated with the content 224, location information associated with the device 210 and the business vehicle 220, zoning information, for example, a city or street that the device 210 and the business vehicle 220 are in, a user profile data or a user account data, a user's historical interests, a user's cookie history, and other relevant information.

In some embodiments, an overall analysis of data collected, including the number of indications of the content 224 sent to users, the timing of indications of content 224 sent to users, and other information may be provided to business owners who advertise through the advertising service 200.

In some embodiments, if the intent of the user 230 is determined to be to purchase a new vehicle, the indication of content 224 may be configured such that the content 224 may provide information associated with various vehicles for purchase and relevant information, for example, local dealership information, inventory at local dealerships, features of certain types of vehicles, comparisons between multiple vehicles, and other information.

Figure 3:
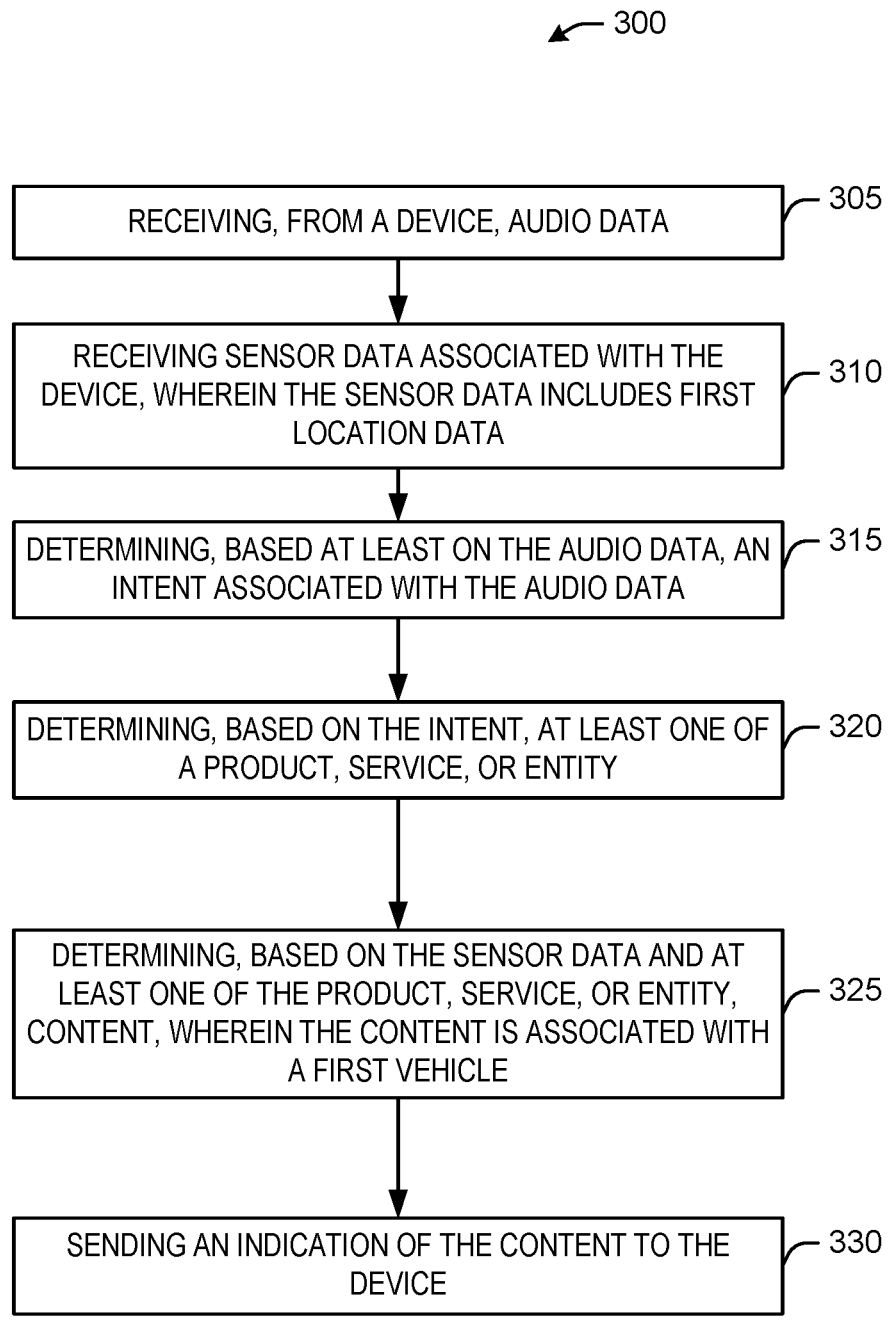
FIG. 3 depicts a flow chart of an example method of sending content to an interested user in accordance with the disclosure.

FIG. 3 depicts a flow chart 300 of an example method of sending content to a user in accordance with the disclosure. The flow chart 300 illustrates a sequence of operations that can be implemented in hardware, software, or a combination thereof. In the context of software, the operations represent computer-executable instructions stored on one or more non-transitory computer-readable media such as a memory, that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be carried out in a different order, omitted, combined in any order, and/or carried out in parallel. Some or all of the operations described in the flow chart 300 may be carried out by the business vehicle 120 either independently or in cooperation with other devices such as, for example, user device 110, and cloud elements (such as, for example, the cloud storage server 240).

At block 305, audio data may be received from a device. In some embodiments, the audio data may be received from a user device associated with a user, such as a mobile phone. In other embodiments, the audio data may be received from a vehicle computer associated with a vehicle that the user is in. The audio data may include words and/or sounds expressed by the user.

At block 310, sensor data associated with the device may be received. In some embodiments, the sensor data may include image data and/or location data associated with the device, which may be the user device or a vehicle computer. In some optional embodiments, the audio data and the sensor data may be received via a wireless communications protocol, for example, Bluetooth®, Wi-Fi, Wi-Max, LTE, or ZigBee®.

At block 315, an intent of the user may be determined based at least on the audio data. In some instances, the intent of the user may be determined by applying NLP to the audio data. In some embodiments, NLP may be applied at the device to determine the intent. In other embodiments, NLP may be applied at a location remote to the device to determine the intent.

At block 320, at least one of a product, service, or entity may be determined based on the intent of the user. As an example, if a user's intent was determined to be associated with plumbing, then products, services, and/or entities associated with plumbing may be determined. In some embodiments, the determination of the product, service, or entity may be additionally based at least in part on a user profile or a user account associated with the device. In such embodiments, the user profile data or the user account data may include an age of the user, a sex of the user, a current address of the user, the user's prior views of products, services, and/or entities, the user's previous purchases, etc. The user profile or the user account may include additional information associated with the user.

At block 325, content may be determined based on the sensor data and at least one of the product, service, or entity. The content may be associated with a business vehicle at a location proximate to the device. In some embodiments, a business vehicle's proximity to the device may be determined based at least in part on a predetermined distance between the business vehicle's detected location and the device. For example, the content may be associated with a business vehicle at a location not more than half a mile away from the device. In some embodiments, the business vehicle's proximity may be further determined based at least in part on a most recent time that the business vehicle was within a predetermined distance from the device. For example, the content may only be determined if the business vehicle was within the predetermined distance from the device less than ten minutes ago.

At block 330, an indication of the content may be sent to the device. In some embodiments, the indication may be configured to be stored at the device. For example, the indication may be in the form of a cookie, which may be stored at the device. In other embodiments, the indication may be in the form of a web link associated with the product, service, or entity, which enables presentation of the content at the device. In some embodiments, prior to the indication of the content being sent to the device, the indication of the content may be generated. In some embodiments, the indication may be generated at the business vehicle, for example, the business vehicle 120. In other embodiments, the indication may be generated at an advertisement server, for example, the cloud server 240.

Figure 4:
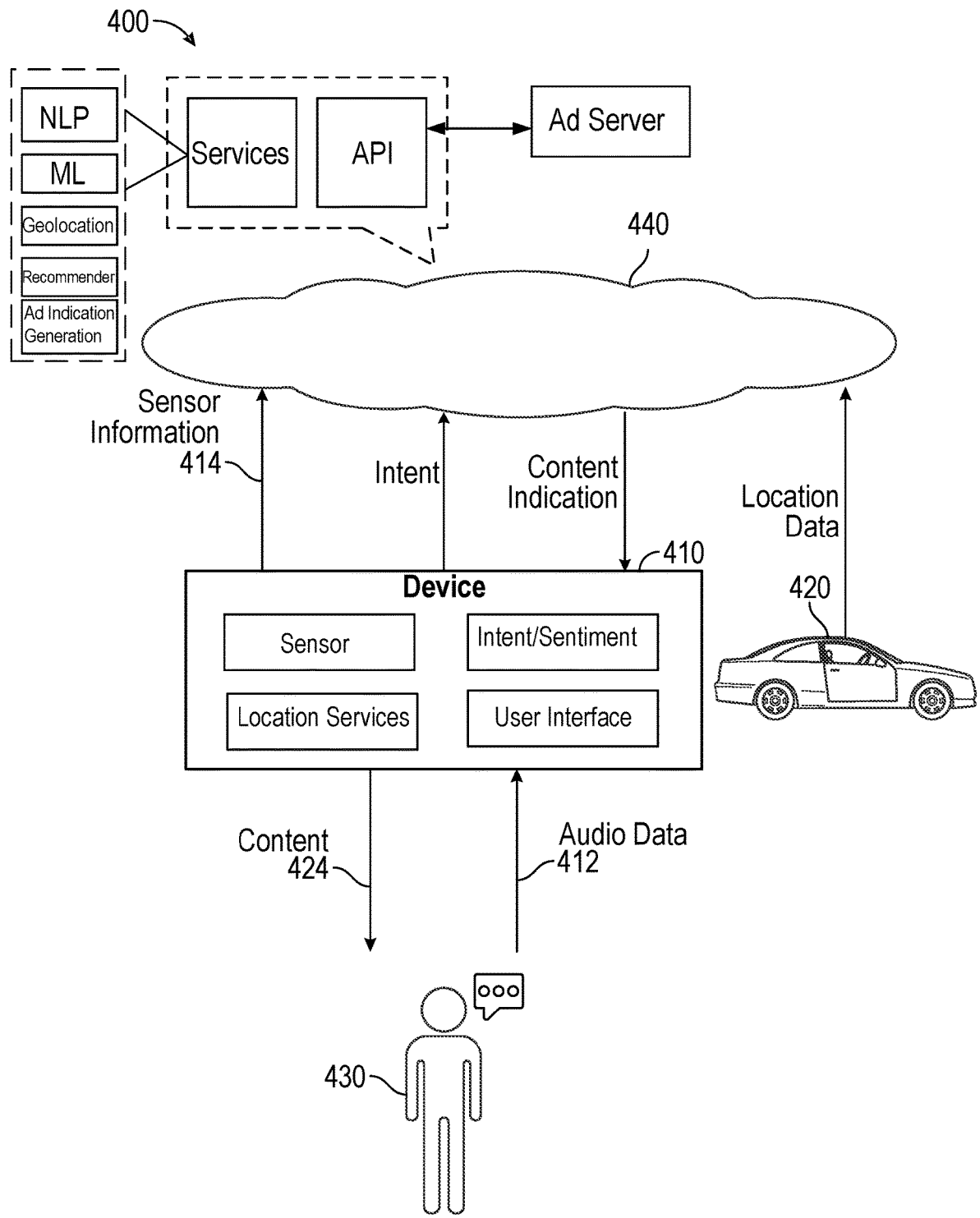
FIG. 4 illustrates an example system for determining targeted content in accordance with an embodiment of the disclosure.

FIG. 4 illustrates an example system 400 for determining targeted content in accordance with an embodiment of the disclosure. A device 410 may be used to receive audio data 412 and to determine sensor information 414. In some embodiments, the device 410 may be a user device, such as a smartphone, a tablet, a laptop, or other user devices. In other embodiments, the device 410 may be a vehicle computer of a vehicle that a user is either driving or a vehicle that the user is a passenger in. In some embodiments, the device 410 may include at least one sensor, such as a microphone, a camera, a Lidar sensor, or any other applicable sensors. The device 410 may further include location service features, for example, a Global Positioning System (GPS), at least one gyro sensor, and any other features that may assist in determining a location of the device 410. The device 410 may additionally include an intent/sentiment determination module, which may be used to interpret the audio data 412 and determine a user's 430 intent. In some embodiments, the device 410 may further include a user interface. The user interface may include a display screen, at least one speaker, at least one haptic sensor, and other features that may aid the user 430 in interacting with the device 410. In some embodiments, the audio data 412 may include content that is being spoken or expressed by the user 430. In some embodiments, the sensor information 414 may include content associated with the device 410, for example, location data associated with the device 410.

In some embodiments, the audio data 412 and the sensor information 414 may be transmitted from the device 410 to a cloud server 440. The cloud server 440 may include an API (Application Programming Interface) and/or a variety of services, such as a recommender service, a geolocation service, a NLP service, a Machine Learning (ML) service, an ad indication generation service, and other services that may assist the cloud server 440. In some embodiments, the API may be configured to communicate with an ad server for determining an advertisement that is associated with the user's 430 intent. The audio data 412 may then be processed at the cloud server 440. In some embodiments, the audio data 412 may be processed using natural language programming (NLP). In some embodiments, an intent of the user 430 may be determined at the device 410 based on the audio data 412. In some embodiments, the cloud server 440 may then determine a product, a service, and/or an entity associated with the intent of the user 430. For example, if the intent of the user 430 is to paint a house, then the determined products, services, and/or entities may include house painting businesses, house painting services, paints, and paint materials.

The cloud server 440 may then identify content 424 based on the sensor data 414 and the determined products, services, and/or entities. For example, in the instance above, the content 424 may include advertisements for house painting businesses, house painting services, paints, and paint materials. In some embodiments, the content 424 may be associated with a vehicle 420 at a location proximate to the device 410, for example, a location determined by the sensor information 114 in FIG. 1. In some embodiments, proximity may refer to the vehicle 420 being within a predetermined distance of the device 410. For example, the vehicle 420 may be considered to be nearby or proximate if it is within half a mile of the device 410. In other embodiments, the vehicle 420 may be considered to be nearby if it was within the predetermined distance from the device 410 within a predefined period of time. For example, if the vehicle 420 was within the predetermined distance from the device 410 in the past ten minutes, then the vehicle 420 may be considered proximate. The cloud server 440 may therefore be configured to receive location data from vehicle 420 and other vehicles that are connected to the cloud server 440 in order to know which vehicles are proximate to the device 410.

In some embodiments, an indication of the content 424 may be identified or generated by the cloud server 440. In some embodiments, indications of the content 424 may include web links associated with the product, service, and/or entity, QR codes associated with the product, service, and/or entity, and any other means of providing the user 430 with access to the product, service, and/or entity. In other embodiments, indications of the content 424 may be in the form of a cookie that may be transmitted to and stored at device 410 until such time as the user 430 searches for content associated with the product, service, and/or entity. In such an embodiment, the content 424 may not be presented to the user 430 until the user 430 actively searches for content associated with the product, service, and/or entity.

In some embodiments, the device 410 and the vehicle 420 are configured to communicate with the cloud server 440 via a network, such as, for example, a computer (a server computer, a cloud computer, etc.) and/or a cloud storage device.

The network may include any one, or a combination of networks, such as, for example, a local area network (LAN), a wide area network (WAN), a telephone network, a cellular network, a cable network, a wireless network, and/or private/public networks such as the Internet. The network may support any of various communications technologies, such as, for example, TCP/IP, Bluetooth®, near-field communication (NFC), Wi-Fi, Wi-Fi Direct, Ultra-Wideband (UWB), cellular, ZigBee®, machine-to-machine communication, and/or man-to-machine communication.

Figure 5:
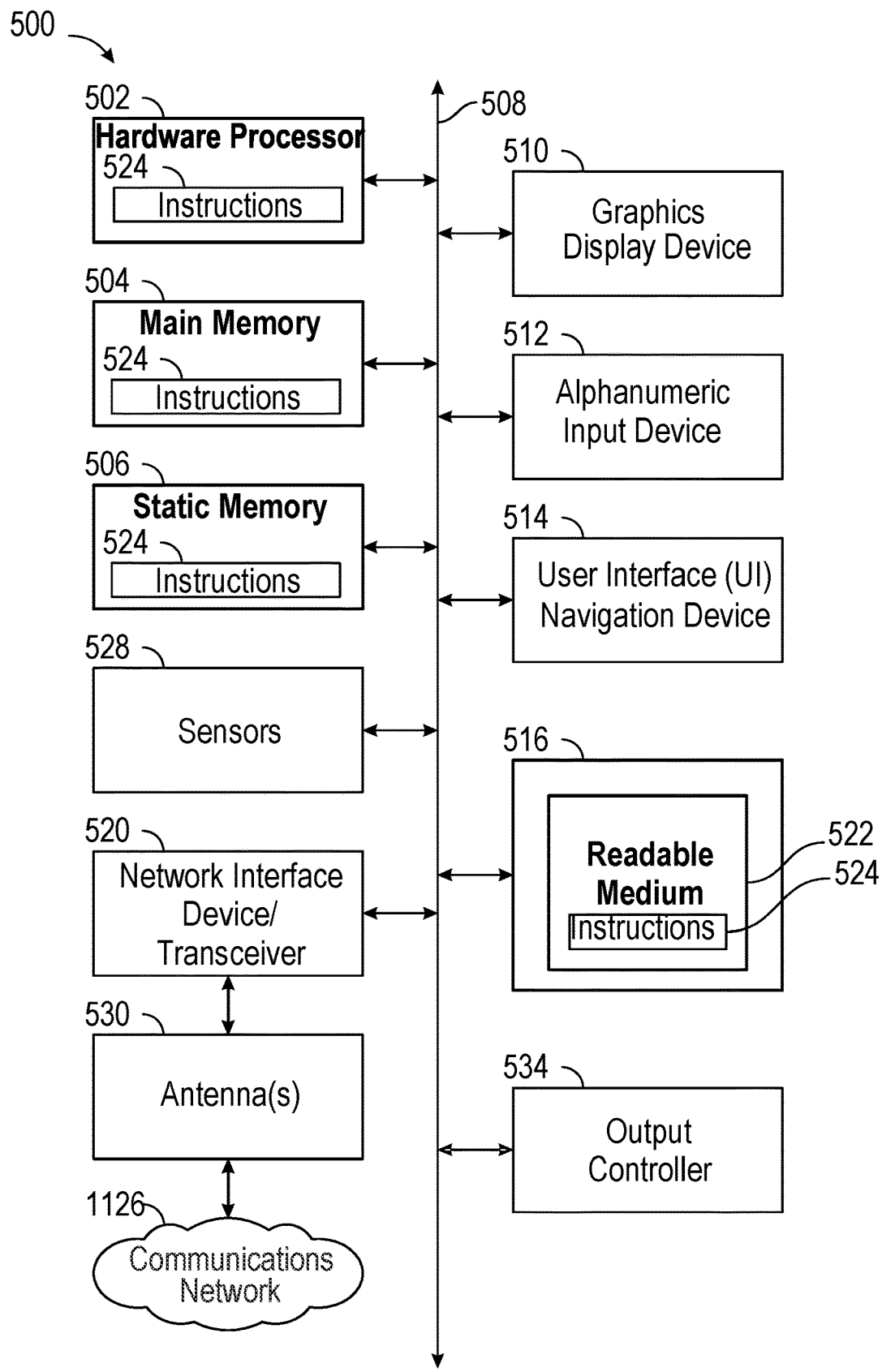
FIG. 5 depicts a block diagram of an example machine upon which any of one or more techniques (e.g., methods) may be performed, in accordance with an embodiment of the disclosure.

FIG. 5 depicts a block diagram of an example machine 500 upon which any of one or more techniques (e.g., methods) may be performed, in accordance with one or more example embodiments of the present disclosure. In other embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environments. The machine 500 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. In some embodiments, the machine 500 may be the device 110, as depicted in FIG. 1. In other embodiments, the machine 500 may be the business vehicle 120, as depicted in FIG. 1. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the execution units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 500 may include a hardware processor 502 (e.g., a central processing unit (CPU), a graphics processing unit (GPU), a hardware processor core, or any combination thereof), a main memory 504 and a static memory 506, some or all of which may communicate with each other via an interlink (e.g., bus) 508. The machine 500 may further include a graphics display device 510, an alphanumeric input device 512 (e.g., a keyboard), and a user interface (UI) navigation device 514 (e.g., a mouse). In an example, the graphics display device 510, the alphanumeric input device 512, and the UI navigation device 514 may be a touch screen display. The machine 500 may additionally include a storage device (i.e., drive unit) 516, a network interface device/transceiver 520 coupled to antenna(s) 530, and one or more sensors 528, such as a global positioning system (GPS) sensor, a compass, an accelerometer, or other sensor. The machine 500 may include an output controller 534, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 516 may include a machine readable medium 522 on which is stored one or more sets of data structures or instructions 524 (e.g., software) embodying or utilized by any one or more of the techniques or functions described herein. The instructions 524 may also reside, completely or at least partially, within the main memory 504, within the static memory 506, or within the hardware processor 502 during execution thereof by the machine 500. In an example, one or any combination of the hardware processor 502, the main memory 504, the static memory 506, or the storage device 516 may constitute machine-readable media.

While the machine-readable medium 522 is illustrated as a single medium, the term "machine-readable medium" may include a single medium or multiple media (e.g., a centralized or distributed database, and/or associated caches and servers) configured to store the one or more instructions 524.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 500 and that cause the machine 500 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 524 may further be transmitted or received over a communications network 526 using a transmission medium via the network interface device/transceiver 520 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 520 may include one or more physical jacks (e.g., Ethernet, coaxial, or phone jacks) or one or more antennas to connect to the communications network 526. In an example, the network interface device/transceiver 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 500 and includes digital or analog communications signals or other intangible media to facilitate communication of such software. The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee®, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize one or more devices that include hardware, such as, for example, one or more processors and system memory, as discussed herein. An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, such as the processor 502, cause the processor to perform a certain function or group of functions. The computer-executable instructions may be, for example, binaries, intermediate format instructions, such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

A memory device, such as the memory 504, can include any one memory element or a combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory device may incorporate electronic, magnetic, optical, and/or other types of storage media. In the context of this document, a "non-transitory computer-readable medium" can be, for example but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random-access memory (RAM) (electronic), a read-only memory (ROM) (electronic), an erasable programmable read-only memory (EPROM, EEPROM, or Flash memory) (electronic), and a portable compact disc read-only memory (CD ROM) (optical). Note that the computer-readable medium could even be paper or another suitable medium upon which the program is printed, since the program can be electronically captured, for instance, via optical scanning of the paper or other medium, then compiled, interpreted or otherwise processed in a suitable manner if necessary, and then stored in a computer memory.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description, and claims refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described example embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey the information that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method comprising:
   receiving, by a first vehicle from a device of a second vehicle, audio data, wherein the audio data includes audio content indicative of an intent of a user of the device, and wherein the device of the second vehicle is located in the second vehicle;
generating, by a sensor system associated with the device, sensor data, wherein the sensor system includes at least one of a microphone, a camera, a Lidar sensor, a global positioning system (GPS), mobile-edge computing (MEC), one or more remote side units (RSUs), one or more gyro sensors, a compass, or an accelerometer, and wherein the sensor data includes first location data;
receiving, by the first vehicle from the sensor system, the sensor data;
receiving, by the first vehicle, account data associated with the device, wherein the account data includes an identification (ID) associated with the user of the device;
determining, by the first vehicle, based at least on the audio data, the intent associated with the audio data;
determining, by the first vehicle, based on the intent and the first location data, at least one of a product, service, or entity;
determining, by the first vehicle, based on the sensor data, the at least one of the product, service, or entity, and the account data, content, wherein the content is associated with the first vehicle;
sending, via Vehicle-to-Network (V2N), Vehicle-to-Infrastructure (V2I), Vehicle-to-Everything (V2X), or Vehicle-to-Pedestrian (V2P) communication of the first vehicle, an indication of the content to the device of the second vehicle, wherein the indication of the content includes at least one of a cookie or a web link associated with the at least one of the product, service, or entity; and
presenting the content to the user, responsive to the user searching for the content, wherein the user searches for the content anonymously using the ID.

2. The method of claim 1, wherein the device of the second vehicle is either a mobile device or a component of the second vehicle.

3. The method of claim 1, wherein the first location data is associated with a first location, and wherein the content is further determined based at least in part on a second location associated with the first vehicle being within a threshold distance of the first location.

4. The method of claim 1, wherein the intent is determined based at least on the audio data using natural language processing (NLP).

5. The method of claim 1, wherein the first location data comprises a first location of the device of the second vehicle, and wherein a route associated with the first vehicle includes the first location of the device of the second vehicle.

6. A first device of a first vehicle, comprising:
at least one memory device that stores computer-executable instructions; and
at least one processor configured to access the at least one memory device, wherein the at least one processor is configured to execute the computer-executable instructions to:
 receive audio data from a second device of a second vehicle, wherein the audio data includes audio content indicative of an intent of a user of the second device, and wherein the second device is located in the second vehicle;
 receive sensor data associated with the second device by the first vehicle, wherein the sensor data includes first location data;
 receive account data associated with the second device, wherein the account data includes an identification (ID) associated with the user of the second device;
 determine, based at least on the audio data, the intent associated with the audio data;
 determine, based on the intent and the first location data, at least one of a product, service, or entity;
 determine, based on the sensor data, the at least one of the product, service, or entity, and the account data, content, wherein the content is associated with the first vehicle;
 automatically send, by a Vehicle-to-Network (V2N), Vehicle-to-Infrastructure (V2I), Vehicle-to-Everything (V2X), or Vehicle-to-Pedestrian (V2P) communication of the first device of the first vehicle, an indication of the content to the second device of the second vehicle, wherein the indication of the content includes at least one of a cookie or a web link associated with the at least one of the product, service, or entity; and
 present the content to the user, responsive to the user searching for the content, wherein the content is anonymously accessible by the user, via the indication of the content, using the ID.

7. The first device of claim 6, wherein the second device is either a mobile device or a component of the second vehicle.

8. The first device of claim 6, wherein the first location data is associated with a first location, and wherein the content is further determined based at least in part on a second location associated with the first vehicle being within a threshold distance of the first location.

9. The first device of claim 6, wherein the intent is determined based at least on the audio data using natural language processing (NLP).

10. The first device of claim 6, wherein the first location data comprises a first location of the second device, and wherein a route associated with the first vehicle includes the first location of the second device.

11. A non-transitory computer-readable medium storing computer-executable instructions which, when executed by a processor, cause the processor to perform operations comprising:
receiving, by a first vehicle from a device of a second vehicle, audio data, wherein the audio data includes audio content indicative of an intent of a user of the device of the second vehicle, and wherein the device of the second vehicle is located in the second vehicle;
receiving, by the first vehicle, sensor data associated with the device, wherein the sensor data includes first location data;
receiving, by the first vehicle, account data associated with the device, wherein the account data includes an identification (ID) associated with the user of the device;
determining, by the first vehicle, based at least on the audio data, the intent associated with the audio data;
determining, by the first vehicle, based on the intent and the first location data, at least one of a product, service, or entity;
determining, by the first vehicle, based on the sensor data, the at least one of the product, service, or entity, and the account data, content, wherein the content is associated with the first vehicle;
automatically sending, by a Vehicle-to-Network (V2N), Vehicle-to-Infrastructure (V2I), Vehicle-to-Everything (V2X), or Vehicle-to-Pedestrian (V2P) device of the first vehicle, an indication of the content to the device of the second vehicle, wherein the indication of the content includes at least one of a cookie or a web link associated with the at least one of the product, service, or entity; and presenting the content to the user, responsive to the user searching for the content, wherein the content is anonymously accessible by the user, via the indication of the content, using the ID.

12. The non-transitory computer-readable medium of claim 11, wherein the device of the second vehicle is either a mobile device or a component of the second vehicle.

13. The non-transitory computer-readable medium of claim 11, wherein the first location data is associated with a first location, and wherein the content is further determined based at least in part on a second location associated with the first vehicle being within a threshold distance of the first location.

14. The non-transitory computer-readable medium of claim 11, wherein the intent is determined based at least on the audio data using natural language processing (NLP).

* * * * *